United States Patent [19]

Robbins

[11] 4,018,690
[45] Apr. 19, 1977

[54] PROCESS FOR PREPARING SULFUR-CONTAINING FERROMAGNETIC CHROMIUM OXIDE

[75] Inventor: Harry Robbins, Los Angeles, Calif.

[73] Assignee: Eastman Kodak Company, Rochester, N.Y.

[22] Filed: Apr. 9, 1975

[21] Appl. No.: 566,548

Related U.S. Application Data

[63] Continuation of Ser. No. 351,116, April 13, 1973, abandoned, which is a continuation-in-part of Ser. No. 196,715, Nov. 8, 1971, abandoned, which is a continuation-in-part of Ser. No. 84,866, Oct. 28, 1970, abandoned.

[52] U.S. Cl. .............................. 252/62.51; 423/607
[51] Int. Cl.$^2$ ........................................ C01G 37/02
[58] Field of Search ................. 252/62.51; 423/607

[56] References Cited

UNITED STATES PATENTS

| | | | |
|---|---|---|---|
| 3,278,263 | 10/1966 | Cox | 252/62.51 X |
| 3,547,823 | 12/1970 | Mihara et al. | 252/62.51 |
| 3,547,824 | 12/1970 | Mihara et al. | 252/62.51 |
| 3,583,917 | 6/1971 | Mihara et al. | 252/62.51 |
| 3,600,314 | 8/1971 | Haines | 252/62.51 |
| 3,640,871 | 2/1972 | Kawamata et al. | 252/62.51 |

OTHER PUBLICATIONS

Kawamata, et al., "Japanese Journal of Applied Physics," vol. 12, No. 11, Nov. 1973, pp. 1737–1741.

*Primary Examiner*—Jack Cooper
*Attorney, Agent, or Firm*—D. M. Schmidt

[57] ABSTRACT

Modified ferromagnetic chromium oxide having an intrinsic coercive force above 150 Oersteds, a Curie temperature lower than that of unmodified chromium dioxide, and a specific magnetization in the range of 50–110 emu/gm., is prepared by heating material containing chromium (III) and sulfur in a form to yield upon oxidation a ferromagnetic chromium oxide with substitutional sulfur enhancing its magnetic properties.

12 Claims, No Drawings

PROCESS FOR PREPARING SULFUR-CONTAINING FERROMAGNETIC CHROMIUM OXIDE

CROSS-REFERENCE TO RELATED APPLICATION

This is a continuation of application Ser. No. 351,116, filed Apr. 13, 1973, now abandoned which application is a continuation-in-part of application Ser. No. 196,715, filed Nov. 8, 1971, now abandoned by Harry Robbins, entitled "SULFATE-CONTAINING FERROMAGNETIC CHROMIUM OXIDE", which, in turn, is a continuation-in-part of application Ser. No. 84,866, filed Oct. 28, 1970 by Harry Robbins, entitled "FERROMAGNETIC CHROMIUM OXIDE OF LOW CURIE TEMPERATURE", now abandoned.

FIELD OF THE INVENTION

The field of art to which the invention pertains includes the field of magnetic compositions, particularly ferromagnetic chromium oxides.

BACKGROUND AND SUMMARY OF THE INVENTION

Ferromagnetic materials are employed in a variety of applications, some of which require a material having a high coercive force and others employing material having low coercive force. In response to these requirements, a variety of ferromagnetic materials have been formulated among which are several forms of ferromagnetic chromium oxide having a tetragonal crystal structure and which have been produced in high coercivity and low coercivity forms. The ferromagnetic species has been identified as chromium dioxide, but the broader term "ferromagnetic chromium oxide" is more suitable for many materials in which substantial modifiers occupy spaces in the crystal lattice. U.S. Pat. No. 2,956,955 to Arthur, Jr., describes a ferromagnetic chromium oxide composition of tetragonal crystal structure which is produced by thermally decomposing chromium trioxide. The material has an intrinsic coercive force range of 35 to 100 Oersteds but by incorporating various modifiers, chromium oxides having a coercivity range of from 26 to 542 Oersteds have been produced; see for example the Ingraham and Swoboda U.S. Pat. Nos. 3,034,988, 3,068,176 and 2,923,683, Oppegard U.S. Pat. No. 2,885,364, Ingraham U.S. Pat. No. 2,923,684, Swoboda U.S. Pat. No. 2,923,685, Balthis, Jr. U.S. Pat. No. 3,449,073, Kobota U.S. Pat. No. 3,243,260, Haines U.S. Pat. No. 3,574,115 and Mihara et al. U.S. Pat. Nos. 3,547,823 and 3,547,824, disclosing the utilization of such modifiers as iron, titanium, vanadium, manganese, cobalt, nickel, fluoride, antimony, ruthenium, tin, alkali metal, alkali metal dichromate, cerium, tellurium, tellurium-tin and tellurium-calcium. Other modifications are obtained by varying the process parameters. For exmaple, Hicks U.S. Pat. No. 3,493,338 describes chromium oxide of zero intrinsic coercivity obtained by low pressure decomposition. Other decomposition processes are disclosed in Hicks U.S. Pat. No. 3,486,851, Hund U.S. Pat. NO. 3,371,043, Arthur, Jr. and Ingraham U.S. Pat. No. 3,117,093 and Cox U.S. Pat. Nos. 3,074,778 and 3,078,147. In addition to the foregoing, various oxidation processes have been disclosed yielding chromium oxide having intrinsic coercivities ranging from 30–445 Oersteds such as described in Cox U.S. Pat. No. 3,278,263 and in Balthis U.S. Pat. No. 3,423,320.

The foregoing developments have been primarily directed toward modifications of the intrinsic coercivity of the chromium oxide, although a few modifiers have been reported to affect the Curie temperature as well. In all cases the modification of the coercivity or Curie temperature were achieved at the expense of a degradation of the magnetic moment. In the case of modifiers of coercivity, moderate degradation of the magnetic moment is tolerable in view of the overall improvement in the magnetic properties. However, no substantial decrease in Curie temperature has been achieved without gross degradation of both the coercivity and the magnetic moment. Recent developments require magnetic materials having high coercivities and magnetic moment but in which the Curie temperature is lowered, or at least retained at its unmodfied level. For example, U.S. Pat. No. 3,364,496 to Greiner, Eichler and Krones describes a Curie point magnetic recording process in which the magnetic recording material is heated to above its Curie point subjected to the magnetic recording filed, and then magnetized by cooling while under the action of the magnetic recording field. When using a polymeric substrate it is very desirable to use ferromagnetic material having a Curie point sufficiently low to avoid thermal decomposition of the substrate.

Unmodified chromium dioxide has a Curie point of about 116° C. A survey of the art reveals that when chromium oxides of substantially lower Curie point are prepared, they generally have low coercivity and magnetic moment in comparison to the high levels desired for magnetic recording. For example, the aforementioned U.S. Pat. No. 3,034,988 discloses that the addition of a combination of vanadium and nickel oxides as modifiers during the preparation of ferromagnetic chromium oxide can produce material having a Curie point of 99° C, but the intrinsic coercivity is only 31 Oersteds and the magnetic moment is low. Similarly, the patent discloses that a modifier combination of vanadium and cobalt oxides results in a decrease of Curie point to 105° C but the material has a coercivity of only 26 Oersteds. In like manner, the addition of manganese (II) sulfate results in a decrease in Curie point to 104° C but a coercivity of only 68 Oersteds. The patent further discloses that the addition of a combination of ferric oxide and chromium phosphate results in a decrease of Curie point to 100° C but a coercivity of only 40 Oersteds and very low magnetic moment. In the aforementioned U.S. Pat. No. 3,068,176, addition of a combination of manganese fluoride and antimony oxide results in a large decrease of Curie point to 87° C, but the material has an intrinsic coercivity of only 57 Oersteds.

The present invention provides ferromagnetic chromium oxide having an intrinsic coercive force above 150 Oersteds and a Curie temperature less than that for unmodified chromium dioxide, i.e., less than 116° C, a novel material not heretobefore available. The oxides also have a sigma range of about 25–110 under VSM conditions (about 15–60 under BH meter conditions), as set forth hereinbelow. The ferromagnetic oxides are obtained by a process in which material comprising a compound of chromium (III) and sulfur in a form as hereinafter defined is heated under conditions to prepare ferromagnetic chromium oxide in the form of fine, acicular particles of tetragonal crystal structure of the rutile type ranging up to 2 microns in length and having a median axial ratio of greater than 2:1. In accordance with present invention, the material comprising chromium (III) is selected from a. material corresponding to the formula $Cr_2O_x(SO_4)_{3-x}$ wherein x ranges from 0 to 2.99,
b. a combination of a compound of chromium (III) combined with oxygen and about 0.1–25 percent by weight, calculated as sulfate ion, of a sulfate compound having the formula $R_2SO_4$ wherein R is an organic radical, H or $NH_4$,
c. a combination of a compound of chromium (III) combined with oxygen and about 0.1–25 percent by weight, calculated as sulfate ion, of a sulfate compound having the formula $(M(H_ySO_4)_{v(y+1)/2}$ wherein M is a trivalent or tetravalent cation other than chromium, v is the valence of M and y is O or 1, and
d. a combination of a compound of chromium (III) combined with oxygen and about 0.1–25 percent by weight, calculated as sulfate ion, of a non-sulfate material which yields sulfate upon oxidation.

DETAILED DESCRIPTION

Ferromagnetic chromium oxide is prepared in accordance with the present invention by heating a material comprising a compound of chromium (III) under oxidizing conditions. In this regard, the procedures set forth in the aforementioned Cox U.S. Pat. No. 3,278,263 are generally applicable. In that patent, there are described processes in which a chromium (III) compound is heated in the presence of an oxidizing agent such as hydrogen peroxide, chromium trioxide and/or by pressuring the reactants with oxygen. In the present procedures, the chromium (III)-containing material is subjected to reaction conditions which are similar to those of the Cox patent. However, sulfur in a form as set forth above is present in the reaction mixture which results in incorporation of sulfur atoms into the crystal structure of the ferromagnetic oxide product and primary modification of the crystal to raise the coercivity significantly lower or maintain the Curie temperature, depending on the concentration of sulfate ion, or equivalent, in the reaction mixture.

It is preferable that the sulfate be supplied in a form in which it is the only modifying agent present, since the effect of all modifiers disclosed have a deleterious effect on the magnetic moment. Accordingly, sources of sulfur such sulfuric acid or ammonium sulfate, which are not associated with metal cations, chromium sulfate, which has a cation common with the host lattice, elemental sulfur, or organic sulfur compounds whose organic residue is destroyed by oxidation, can be used in the preparation of the sulfur modified ferromagnetic chromium oxide. In a particularly preferred embodiment, a basic chromium sulfate is precipitated from a solution of chromium sulfate with ammonium hydroxide. Considerable sulfate is coprecipitated with the hydroxide, and on dehydration leads to a product which corresponds to the formula $Cr_2O_x(SO_4)_{3-x}$. The value of x depends on the conditions of the precipitation, and may be up to 2.99.

Metal ions, expecially trivalent or tetravalent metal ions generally tend to decrease the magnetic moment of the chromium oxide. The introduction of ions of valence less than 4 into the lattice apparently necessitates charge compensation by forcing some chromium ions to assume valences greater than 4, in which state they have fewer electrons capable of contributing to the magnetic moment. Since sulfur substitutes for chromium as a hexavalent ion charge compensation can be accomplished by the introduction of some secondary modifying agents of lower valence than 4, without incurring additional penalties of lower magnetic moment. Iron (III) sulfate is especially useful in this respect since it yields a product of high coercivity. In general, sufates of the general formula $M(H_ySO_4)_{v(y-1)}/2$ can be made wherein M is a trivalent or tetravalent cation other than chromium, v is the valence of M and y is O or 1.

The extent of reduction of Curie temperature, for similar processing conditions, depends on the nature of the starting sulfate or equivalent and the amount used. Under most conditions, by using smaller amounts of a particular sulfur-containing modifier, smaller reductions in Curie temperature from that of unmodified chromium dioxide can be achieved. The exact amounts required can be readily determined by simple experiment using, say, 0.1, 0.5, 1.0 and 2.0 weight percent sulfur compound, calculated as sulfate, or higher if needed. The Curie temperature decrease can then be correlated with quantity of modifier and that amount chosen to yield the desired properties. In this way chromium oxides having coercivities above 150 Oersteds and Curie temperature decreases of 1°–40° C or more can be obtained. Generally, the sulfur component is used at a level of about 0.1–25%, preferably by weight based on the weight of the starting material but calculating the chromium compound as chromium dioxide and the sulfur as sulfate. Although there may be rejection of sulfur by the host lattice, a substantial portion is incorporated into the product, depending on the amount of sulfur present and the environmental conditions. Accordingly, the final product will have a level of sulfur content of about 0.01–20 weight percent sulfate.

If desired, supplemental modifying agents may be used in the process of this invention. Examples of modifying agents are found in the patents above referred to and include such compounds as the oxides of antimony, ruthenium, tellurium, and the like. Such modifiers serve to impart high intrinsic coercivity without detracting from the advances of maintaining or lowering the Curie point as obtained by the process of this invention.

The definition of intrinsic coercive force is given in Special Technical Publication No. 85 of the American Society for Testing Materials, entitled "Symposium on Magnetic Testing" (1948), pages 191–198. The specific magnetization, also referred to as the sigma value, is equal to the intensity of magnetization divided by the density of the material and is expressed in emu/gm. The sigma values and intrinsic coercivities as hereafter presented were at times determined at room temperature with a BH meter at 60 cycles in a field of 2000 Oersteds; at other times, the magnetic properties of the samples were measured in a saturating field of 16,000 Oersteds using a vibrating sample magnetometer (VSM) at room temperature and at about −150° C (1959). Curie temperature is determined by observing the force exerted on a specimen by a non-uniform magnetic field at a series of temperatures. The temperature above which ferromagnetism disappears is the Curie temperature.

Referring more particularly to process conditions, oxidation of the starting material is conducted under hydrothermal conditions in a strongly oxidizing environment. The amount of oxidizing agent should be present in quantities sufficient to convert the starting material completely to ferromagnetic chromium oxide requiring at least one-half atomic equivalent of oxygen for each atomic equivalent of chromium (III). Generally, the oxidizing agent will be employed in an amount of 1.5–5 times the minimum requirement, but with gaseous oxygen or the like, much larger proportions of oxidizing agent can be employed. In the general form of the invention, any oxidant can be used which will cause the conversion of chromium (III) to chromium (V), such as hydrogen peroxide, chromium trioxide, or oxygen under pressure, and the Cox U.S. Pat. No. 3,278,263 can be referred to for specific conditions. Generally it is preferred to utilize chromium trioxide as the oxidant, heating the components under oxygen pressure in an aqueous support.

Generally, about 1 to about 300% of water by weight of starting material (or higher, but with no particular advantage) can be utilized. Depending upon the stages of treatment, the chromium (III) compound is converted to chromium dioxide by heating at a temperature above about 200° C (generally about 600° C is a practical upper limit) for from a few minutes to several hours e.g., 24 hours, under pressures which range from substantially atmospheric (e.g., 0.5–5.0 atmospheres) to superatmospheric pressures, up to 3000 atmospheres or higher. For example, when heating directly from the precipitate, a pressure of from about 50 to about 3000 atmospheres or more can be utilized. The precipitate can be first heated or calcined at substantially atmospheric pressure, as above defined, to a temperature of about 200°–1000° C for a time ranging from a few minutes to a day or more. Such calcining is preferably carried out in the presence of air and can take place from a few minutes to a day or more. The resultant oxide is converted to ferromagnetic chromium oxide by oxidation at elevated pressure and temperature.

By intimately associating sulfate ion, or a material yielding sulfate ion, with the chromium (III) component of the starting material, the ferromagnetic chromium oxide which is produced has properties which are markedly superior to the properties of the material obtained using only chromium combined with oxygen. In particular, ferromagnetic chromium oxide is obtained with the present invention having much lower Curie temperatures than heretobeore obtained with oxides of like coercivity. The specific magnetization of the oxide is also maintained at a high level. In particular, ferromagnetic oxide is produced having an intrinsic coercive force above 150 Oersteds, generally ranging up to about 600 Oersteds or higher, a Curie temperature lower than that of unmodified chromium dioxide and a specific magnetization at room temperature (about 18°–20° C) of about 25–110 emu/gm. VSM, or about 15–60 emu/gm., with a BH meter. It is preferred for some end magnegraphic applications to have a Curie temperature as low as possible. By using at least 1.5% by weight of sulfur, calculated as sulfate as above, Curie temperature below 100° C and as low as 72° C, or lower, can be obtained.

While it is not intended to rely on any particular theoretical consideration, it is believed that the sulfur under the conditions of oxidation coexists with the chromium in the same lattice on metal ion sites and functions as a primary modifier to lower the Curie point. The crystals obtained are in the form of fine acicular particles of tetragonal crystal structure of the rutile type ranging up to 2 microns in length and having a median axial ratio of greater than 2:1, generally about 2:1 to about 20:1 According, a new composition of matter is provided, defined by there foregoing crystal structure, coercivity and Curie point parameters.

In the preferred precipitation method referred to above wherein the starting material is precipitated from a solution of chromium (III) sulfate, one can start with an aqueous solution of chromium (III) sulfate or a mixture of the sulfate and a different chromium (III) salt, such as chromic chloride hexahydrate, chromic nitrate nonahydrate, chromic iodide, chromic bromide, chromic citrate, and the like, or mixtures thereof. The starting material can be precipitated by adding a base, such as ammonium hydroxide, to the aqueous solution with agitation until a ph in the range of 7–9 is obtained whereupon a combination of chromium sulfate and chromium hydroxide precipitates. The precipitate is allowed to settle and the supernatant liquid is syphoned off. The precipitate can then be washed several times by decantation with water, filtered and air dried. The precipitate as such can be used or it can further be heated to a dehydrated, oxide-sulfate form, and that form utilized for subsequent oxidation.

As above indicated, one can utilize elemental sulfur finely admixed with chromium sesquioxide. One can also utilize and organo sulfate material or non-sulfate material which yields a sulfate upon oxidation such as organic sulfides, sulfenic acid, sulfinic acid, sulfones, sulfonic acids, sulfoxides and the like. Specific examples include benzene-sulfenic acid and the methyl and ethyl esters thereof, 4-sulfo-benzoic acid, 4-sulfino-benzoic acid dimethylsulfide, dimethyldisulfide, dimethyltrisulfide, dimethylsulfoxide, dimethylsulfone, ethylmethyl sulfide, ethylmethyl disulfide, ethylmethyl trisulfide, ethylmethyl sulfoxide, ethylmethyl sulfone, methylthio-benzene, methyldithio-benzene, methyltrithiobenzene, methylsulfinyl-benzene and methylsulfonyl-benzene, aluminum sulfide, antimony sulfides, gallium sulfides, and the like, or mixtures thereof.

Particular examples of suitable metal sulfates include: aluminum sulfate, antimony sulfate, bismuth sulfate, ceric sulfate, cobaltic sulfate, dysprosium sulfate, gadolinium sulfate gallium sulfate, indium sulfate, iridium sulfate, ferric sulfate, lanthanum sulfate, neodymimum sulfate, platinic sulfate, praseodymium sulfate, ruthenium sulfate, rhodium sulfate, samarium (III) sulfate, scandium sulfate, thallium (III) sulfate, stannic sulfate and titanium (III) sulfate.

The invention is illustrated further by the following examples in which the proportions of ingredients are expressed in parts by weight. Note that in Examples 1–3, Curie temperature was measured with a small field, one that would yield a Curie temperature for unmodified Chromium dioxide of 108° C. The other examples are full field measurements which yield a Curie temperature of 116° C for unmodified chromium dioxide.

EXAMPLE 1

To 500 parts of a solution containing 150 parts chromic sulfate, 150 parts of ammonium hydroxide were added to precipitate a mixture of chromium hydroxide and chromium sulfate, which was filtered, washed with distilled water, dried and heated at about 500° C in air to form a chromium (III) oxide-sulfate starting mixture. Thirty-eight parts of this mixture was combined with 22 parts of chromium trioxide and 25 parts of water. The mixture was placed in a water bath and stirred until an homogenous paste was obtained. The test tube was then placed in a bomb which was fitted with piping to admit oxygen under pressure and with a pressure gauge to indicate the amount of oxygen present. The bomb was sealed and sufficient oxygen was pumped into the bomb to obtain a pressure of 5000 psi. The bomb was then placed in a furnace and the furnace was then heated to 350° C and maintained at that temperature for 4 hours. The pressure gauge on the bomb was monitored to maintain a pressure of 15,000 psi. The bomb was then cooled and the pressure released. Product obtained from the test tube was washed several times with distilled water and dried in an oven at 100°–120° C. The product obtained was found to be fine, acicular chromium oxide of tetragonal crystal structure of the rutile type having a coercivity of 255 Oersteds and a sigma of 73 emu/gm. at room temperature (VSM). The product was found to have a Curie temperature of 76° C which, when compared to chromium oxide similarly prepared without sulfate ion addition, represents a Curie temperature depression of 32° C.

EXAMPLE 2

Twenty-eight parts of chromium trioxide, 32 parts of chromium sesquioxide and 3 parts of chromic sulfate were placed in an open test tube and 25 parts of water were added. This represents 3.7 weight percent based on the weight of the chromium trioxide, chromium sesquioxide and chromic sulfate as chromium dioxide. The mixture was placed in a water bath and stirred until an homogenous paste was obtained. The test tube was then placed in a bomb as in Example 1. Oxygen was added to a pressure of 5000 psi and the bomb was placed in a furnace at 310°–350° C and heated for 4 hours to a maximum pressure of 14,000 psi. The bomb was then cooled and pressure released to yield a fine, acicular product which, after washing with distilled water and dried was found to have an intrinsic coercivity of 343 Oersteds, a sigma of 81 at room temperature (VSM) and a Curie temperature of 89° C, representing a Curie temperature depression of 19° C.

EXAMPLE 3

Twenty-eight parts of chromium trioxide, 32 parts of chromium sesquioxide and 2 parts of concentrated sulfuric acid were placed in an open test tube and 30 parts of water were added. This represents 3.4 weight percent sulfate ion based on the weight of the chromium trioxide and chromium sesquioxide as chromium dioxide. The mixture was placed in a water bath and stirred until an homogenous paste was obtained. The test tube was then placed in a bomb as in Example 1. Oxygen at a pressure of 5000 psi was added and the bomb was placed in a furnace at 325° C and heated for 4 hours to a maximum pressure of 16,000 psi. The bomb was then cooled and pressure released to yield a fine acicular product which, after washing with distilled water and dried, was found to have an intrinsic coercivity of 312 Oersteds, a sigma of 74(VSM) and a Curie temperature of 86° C, representing a Curie temperature depression of 22° C.

EXAMPLE 4

Twenty-eight parts of chromium trioxide, 32 parts of chromium sesquioxide and 4 parts of aluminum sulfate octadecahydrate $[Al_2(SO_4)_3 \cdot 18H_2O]$ were placed in an open test tube and 25 parts of water were added. This represents 2.9 weight percent sulfate ion and 0.6 weight percent cation based on the weight of the chromium trioxide and chromium sesquioxide as chromium dioxide. The mixture was placed in a water bath and stirred until a completely homogenous paste was obtained. The test tube was then placed in a bomb as in Example 1. Oxygen at a pressure of 5,000 psi was added and the bomb was placed in a furnace at 330°–345° C and heated for 4 hours to a maximum pressure of 15,000 psi. The bomb was then cooled and the pressure released to yield a fine acicular product which, after washing with distilled water and drying, was found to have an intrinsic coercivity of 380 Oersteds, a sigma of 43.9 at room temperature (BH meter) and a Curie temperature of 90° C representing a Curie temperature depression of 26° C.

EXAMPLE 5

Chromium sesquioxide was prepared by dissolving chromium nitrate nonohydrate in water to the extent of about 15 weight percent and adding ammonium hydroxide in sufficient amount to precipitate chromium hydroxide $[Cr(OH)_3]$ which was washed with distilled water, dried and heated to 500° C for 2 hours.

Thirty-two parts of the chromium sesquioxide thus prepared, 28 parts of chromium trioxide and 3 parts of ammonium sulfate were added to an open test tube and 30 parts of water were added to the mixture. This represents 3.7 weight percent sulfate ion and 1.4 weight percent cation based on the weight of the chromium trioxide and chromium sesquioxide as chromium dioxide. The mixture was stirred in a water bath until an homogenous paste was produced. The test tube was then placed in a bomb as in Example 1. Oxygen at pressure of 6000 psi was added and the bomb was placed in a furnace at 335° C and heated for 5 hours to a maximum pressure of 17,000 psi. The bomb was then cooled and pressure released to yield a fine, acicular product which, after washing with distilled water and drying, was found to have an intrinsic coercivity of 327 Oersteds, a sigma at room temperature of 52.0 (BH meter) and a Curie temperature of 94° C, representing a Curie temperature depression of 22° C.

EXAMPLE 6

Twenty-eight parts of chromium trioxide, 32 parts of chromium sesquioxide and 3 parts of ceric sulfate $Ce(HSO_4)_4$, were added to 50 parts of water in an open dish and dried at 300° C for 12 hours. The mixture was then ground in a ball mill and added to a test tube which was placed in a bomb as in Example 1. Oxygen at a pressure of 5000 psi was added and the bomb was placed in a furnace at 330°–345° C and heated for 3.5 hours to a maximum pressure of 15,000 psi. The bomb was then cooled and pressure released to yield a fine, acicular product which, after washing with distilled water and drying, was found to have an intrinsic coercivity of 260, a sigma at room temperature of 59.0 (BH meter) and a Curie temperature of 83° C, representing a Curie temperature depression of 33° C.

EXAMPLE 7

The procedure in Example 5 was repeated except that in place of the ammonium sulfate, 4 parts of ceric sulfate. $Ce(HSO_4)_4$ were added to the test tube. In addition, 1 part of tellurium oxide was added as a supplemental modifier. This represents 4.9 weight percent sulfate ion and 1.8 weight percent cation, based on the weight of the chromium trioxide and chromium sesquioxide as chromium dioxide. An initial oxygen pressure of 5000 psi was utilized and maintained during heating at a maximum of 16,000 psi. Fine, acicular chromium oxide was obtained which was found to have an intrinsic coercivity of 322, a sigma of 40.6 at room temperature (BH meter) and a Curie temperature of 92° C, representing a Curie temperature depression of 24° C.

there is given the amount of cation based on chromium dioxide.

TABLE I

| Example | Modifier | % $SO_4^=$ | % Cation | $CrO_3/Cr_2O_3$ | Time, Hours | ΔTc, °C | Hc,[1] Oersteds | Sigma,[1] emu/gm. |
|---|---|---|---|---|---|---|---|---|
| 1 | $SO_4^=$ | 1.8 | — | 0.58 | | −32 | 255 | 81,107[2] |
| 2 | $Cr_2(SO_4)_3$ | 3.8 | 1.3 | 0.88 | | −19 | 343 | 81,107[2] |
| 3 | $H_2SO_4$ | 3.4 | 0.7 | 0.88 | | −30 | 312 | 74,102[2] |
| 4 | $Al_2(SO_4)_3 \cdot 18H_2O$ | 2.9 | 0.6 | 0.88 | 4 | −26 | 380 | 44 |
| 5 | $(NH_4)_2 SO_4$ | 3.7 | 1.4 | 0.88 | 5 | −22 | 327 | 52 |
| 6 | $Ce(HSO_4)_4$ | 3.7 | 1.3 | 0.88 | 3.5 | −33 | 260 | 59 |
| 7 | $Ce(HSO_4)_4$[3] | 4.9 | 1.8 | 0.88 | 5 | −24 | 322 | 41 |
| 8 | $Ce(HSO_4)_4$[4] | 4.9 | 1.8 | 0.88 | 4 | −26 | 340 | 37.2 |
| 9 | $Fe_2(SO_4)_3 \cdot \approx 6H_2O$ | 12.0 | 4.8 | 1.40 | 4 | −30 | 546 | 27.1 |
| 10 | $NH_4NO_3$ | — | 1.5 | 0.88 | 3.5 | −4 | 442 | 63.1 |
| 11 | $NH_4Cl$ | — | 1.7 | 0.88 | 5 | −5 | 347 | 57.0 |
| 12 | $CeO_2$ | — | 2.8 | 0.88 | 5 | −3 | 312 | 59.1 |
| 13 | $Fe_2O_3$[5] | — | 10.4 | 1.21 | 4 | +2 | 546 | 48.5 |
| 14 | $Fe(NO_3)_3 \cdot 9H_2O$ | — | 2.4 | 0.76 | 4 | +27 | 520 | 44.5 |

[1] BH meter at room temperature, unless otherwise indicated
[2] vibrating sample magnetometer at ≈−150° C and room temperature, respectively
[3] plus 1.7 weight percent $TeO_2$
[4] plus 1.7 weight percent $Sb_2O_3$
[5] 18,000 maximum oxygen pressure

EXAMPLE 8

The process of Example 7 was repeated except that the tellurium oxide was substituted with 1 part of antimony trioxide and the mixture was heated for 4 hours instead of 5 hours. The product obtained was fine, acicular chromium oxide having an intrinsic coercivity of 340 Oersteds, a sigma of 37.2 at room temperature (BH meter) and a Curie temperature of 90° C, representing a Curie temperature depression of 26° C.

EXAMPLE 9

Twenty-five parts of chromium sesquioxide derived from chromium nitrate nonohydrate, as in Example 5, 35 parts of chromium trioxide and 12 parts ferric sulfate hexahydrate [$Fe_2(SO_4)_3 \cdot \approx 6H_2O$] were added to an open test tube and 30 parts of water were added. The mixture was stirred in a water bath until an homogenous paste was obtained. This represents 12.0 weight percent sulfate ion and 4.8 weight percent cation based on the weight of chromium trioxide and chromium sesquioxide as chromium dioxide. The test tube was placed in a bomb under 6000 psi oxygen pressure and sealed. The bomb was placed in a furnace and heated to 325° C and maintained at that temperature for 4 hours, after which the bomb was cooled, the pressure released and the product washed several times with distilled water and dried. The product was found to be fine, acicular chromium oxide having an intrinsic coercivity of 546 Oersteds, a sigma at room temperature of 27.1 (BH meter) and a Curie temperature of 86° C, representing a Curie temperature depression of 30° C.

In each of the foregoing examples, sufficient sulfur-containing modifier was used to lower the Curie temperature to below 100° C. In Table I, a comparison is made with chromium oxides prepared utilizing various non-sulfate modifiers. In each of the Examples 10–14, the preparation involved using 30 parts of water, 6000 psi initial oxygen pressure and 17,000 psi maximum oxygen pressure, except where indicated. The ratio of chromium trioxide to chromium sesquioxide and the heating time are given for each example. In addition, Referring to Table I, it will be seen that in the absence of a sulfate ion, product having high coercivity and sigma can be produced but with Curie points relatively near or higher than the Curie point of pure chromium dioxide.

In the following examples 15–18 lower amounts of sulfur-containing modifier are used to produce chromium oxide having Curie temperatures closer to that of unmodified chromium dioxide, illustrating the ability to tailor the properties of chromium oxide produced in accordance with the present invention.

EXAMPLE 15

The procedure of Example 5 was substantially followed except that only 1 part of ammonium sulfate was added. This represents 1.2 weight percent sulfate ion and 0.5 weight percent cation based on the weight of the chromium oxides as chromium dioxide. Oxygen pressure was 5000 psi and the temperature of reaction was 310°–360° C. An acicular product was obtained which was found to have an intrinsic coercivity of 352 Oersteds, a sigma at room temperature of 80.0 (VSM) and a Curie temperature of 105° C, representing a Curie temperature depression of −11° C.

EXAMPLE 16

The procedure of Example 5 as substantially followed except that only 0.5 part of ammonium sulfate was added. This represents 0.6 weight percent sulfate ion and 0.25 weight percent cation based on the weight of the chromium oxides as chromium dioxide. Oxygen pressure was 5000 psi. The temperature of reaction was 310°–325° C to a maximum pressure of 13,500 psi for 4 hours. An acicular product was obtained which was found to have an intrinsic coercivity of 357 Oersteds, a sigma at room temperature of 78.0 (VSM) and a Curie temperature of 114° C, representing a Curie temperature depression of 2° C.

EXAMPLE 17

The procedure of Example 6 was substantially followed except that only 2 parts of ceric sulfate were added. This represents 2.5 weight percent sulfate ion and 0.9 weight percent cation based on the weight of the chromium oxides as chromium dioxide. The temperature of reaction was 310°–350° C for 4 hours. An acicular product was obtained which was found to have an intrinsic coercivity of 379 Oersteds, a sigma at room temperature of 74.0 (VSM) and a Curie temperature of 115° C, representing a Curie temperature depression of −1° C.

EXAMPLE 18

The procedure of Example 9 was followed except that only 3 parts of ferric sulfate hexahydrate were added to 28 parts of chromium sesquioxide and 25 parts of chromium trioxide. This represents 1.1 weight percent sulfate ion and 1.3 weight percent cation based on the weight of the chromium oxides as chromium dioxide. Oxygen pressure was 5000 psi and the temperature of reaction was 310°–350° C. An acicular product was obtained which was found to have an intrinsic coercivity of 421 Oersteds, a sigma at room temperature of 60.0 (VSM) and a Curie temperature of 112° C, representing a Curie temperature depression of 4° C.

EXAMPLE 19

The procedure of Example 3 can be repeated except that in the place of sulfuric acid, one can add an equal amount of dimethyl sulfoxide to obtain a fine, acicular product which has a high intrinsic coercivity and sigma, but depressed Curie temperature, in accordance with the advantages of the present invention. In place of the dimethyl sulfoxide, one can utilize elemental sulfur or any of the organic sulfur containing compounds previously referred to.

I claim:

1. In a process in which material comprising a compound of chromium (III) is heated at a temperature above 200° C, at a pressure of about 50–3000 atmospheres, and in the presence of about 1–300% by weight of water based on the weight of compound heated, with an oxidizing agent under conditions to prepare a ferromagnetic chromium oxide in the form of fine, acicular particles of tetragonal crystal structure of the rutile type ranging up to two microns in length and having a median axial ratio of greater than 2:1, the improvement according to which said material comprising a compound of chromium (III) is selected from
a. a basic chromium sulfate corresponding to the formula $Cr_2O_x(SO_4)_{3-x}$ wherein $x$ is a value up to 2.99, and
b. a combination of a compound of chromium (III) combined with oxygen and about 0.1–25 percent by weight of said chromium compound, calculated as chromium dioxide, of a sulfate compound, calculated as sulfate ion, having the formula $R_2SO_4$ wherein R is an organic radical, H or $NH_4$.

2. The process according to claim 1 in which said material comprising chromium (III) is a basic chromium sulfate corresponding to the formula $Cr_2O_x(SO_4)_{3-x}$ wherein $x$ is a value up to 2.99.

3. The process according to claim 1 in which said material comprising chromium (III) is a basic chromium sulfate corresponding to the formula $Cr_2O_x(SO_4)_{3-x}$ wherein $x$ is a value up to 2.99 and is obtained by precipitation by adding a base to a solution of chromium (III) sulfate.

4. The process according to claim 1 in which said material containing a compound of chromium (III) is a combination of a compound of chromium (III) combined with oxygen and a sulfate compound having the formula $R_2SO_4$ wherein R is an organic radical, H or $NH_4$, said sulfate compound being in an amount equivalent to about 0.1–25 percent by weight sulfate ion based upon the chromium compound calculated as chromium dioxide.

5. A process for the preparation of ferromagnetic chromium oxide which comprises:
adding a base to a solution of chromium sulfate to precipitate a basic chromium sulfate which, upon dehydration, corresponds to the formula $Cr_2O_x(SO_4)_{3-x}$ wherein $x$ is a value up to 2.99, and heating said material with an oxidizing agent at a temperature above 200° C under a pressure of about 50–3000 atmospheres in the presence of about 1–300% by weight of water based on the weight of said sulfate.

6. The process of claim 5 wherein said heating step is done at a temperature of about 200°–600° C.

7. In a process in which material comprising a compound of chromium III is heated at a temperature above 200° C, at a pressure, of about 50–3000 atmospheres, and in the presence of about 1–300% by weight of water based on the weight of compound heated, with an oxidizing agent under conditions to prepare a ferromagnetic composition comprising fine, acicular particles of tetragonal crystal structure of the rutile type in which is included a ferromagnetic chromium oxide, said particles ranging up to 2 microns in length and having a median axial ratio of greater than 2:1, the improvement according to which said material comprising a compound of chromium III is a combination of a compound of chromium III combined with oxygen and ceric sulfate, said ceric sulfate being in an amount equivalent to about 0.1–25 percent by weight sulfate ion based upon the chromium compound calculated as chromium dioxide.

8. In a process in which material comprising a compound of chromium III is heated at a temperature above 200° C, at a pressure of about 50–3000 atmospheres, and in the presence of about 1–300% by weight of water based on the weight of compound heated, with an oxidizing agent under conditions to prepare a ferromagnetic composition comprising fine, acicular particles of tetragonal crystal structure of the rultie type in which is included a ferromagnetic chromium oxide, said particles ranging up to 2 microns in length and having a median axial ratio of greater than 2:1, the improvement according to which said material comprising a compound of chromium III is a combination of a compound of chromium III with oxygen and aluminum sulfate, said aluminum sulfate being in an amount equivalent to about 0.1–25 percent by weight sulfate ion based upon chromium compound calculated as chromium dioxide.

9. In a process in which material comprising a compound of chromium III is heated at a temperature above 200° C, at a pressure of about 50–3000 atmospheres, and in the presence of about 1–300% by weight of water based on the weight of compound heated, with an oxidizing agent under conditions to prepare a ferromagnetic composition comprising fine, acicular particles of tetragonal crystal structure of the ruitle type in which is included a ferromagnetic chromium oxide, said particles ranging up to two microns in length and having a median axial ratio of greater than 2:1, the improvement according to which said material comprising a compound of chromium III is a combination of a compound of chromium III combined with oxygen and sulfur, said sulfur being in an amount equivalent to about 0.1–25 percent by weight sulfate ion based upon the chromium compound calculated as chromium dioxide.

10. In a process in which material comprising a compound of chromium (III) is heated at a temperature above 200° C, at a pressure of about 50–3000 atmospheres, and in the presence of about 1–3000% by weight of water based on the weight of compound heated, with an oxidizing agent under conditions to prepare a ferromagnetic chromium oxide in the form of fine, acicular particles to tetragonal crystal structure of the rutile type ranging up to two microns in length and having a median axial ratio of greater than 2:1, the improvement according to which said material comprising a compound of chromium (III) is selected from
  a. a combination of a compound of chromium (III) combined with oxygen and about 0.1–25 percent by weight of said chromium compound, calculated as chromium dioxide, of a sulfate compound, calculated as sulfate ion, having the formula $M(H_ySO_4)_{v(y+1)/2}$ wherein M is a trivalent or tetravalent cation other than chromium, $v$ is the valence of M and $y$ is 0 or 1, and
  b. a combination of a compound of chromium (III) combined with oxygen and about 0.1–25 percent by weight of said chromium compound, calculated as chromium dioxide, of a non-sulfate material calculated as chromium dioxide, of a non-sulfate material calculated as sulfate ion, which contains at least one sulfur atom and yields sulfate upon oxidation.

11. The process according to claim 10 in which said material containing a compound of chromium (III) comprises a combination of a compound of chromium (III) combined with oxygen and about 0.1–25 percent by weight of said chromium compound, calculated as chromium dioxide, of a sulfate compound, calculated as sulfate ion, having the formula $M(H_ySO_4)_{v(y+1)/2}$ wherein M is a trivalent or tetravalent cation other than chromium, $v$ is the valence of M and $y$ is 0 or 1.

12. The process according to claim 10 in which said material containing a compound of chromium (III) comprises a combination of a compound of chromium (III) combined with oxygen and about 0.1–25 percent by weight of said chromium compound, calculated as chromium dioxide, of a non-sulfate material, calculated as sulfate ion, which contains at least one sulfur atom and yields sulfate upon oxidation.

* * * * *

UNITED STATES PATENT AND TRADEMARK OFFICE
CERTIFICATE OF CORRECTION

PATENT NO. : 4,018,690
DATED : April 19, 1977
INVENTOR(S) : Harry Robbins

It is certified that error appears in the above-identified patent and that said Letters Patent are hereby corrected as shown below:

Column 1, line 57, "exmaple" should read --example--.

Column 2, line 49, after "U.S. Pat. No. 3,068,176," --the-- should be inserted.

Column 5, line 45, "heretobeore" should read --heretobefore--.

Column 6, line 2, "there" should read --the--.

Column 6, line 44, "neodymimum" should read --neodymium--.

Column 12, line 43, "rultie" should read --rutile--.

Column 12, line 61, "ruitle" should read --rutile--.

Column 13, line 6, "1-3000%" should read --1-300%--.

Signed and Sealed this ninth Day of August 1977

[SEAL]

Attest:

RUTH C. MASON
Attesting Officer

C. MARSHALL DANN
Commissioner of Patents and Trademarks